US010237831B2

United States Patent
Zhu (10) Patent No.: US 10,237,831 B2
(45) Date of Patent: Mar. 19, 2019

(54) OUTER LOOP POWER CONTROL METHOD, APPARATUS, AND DEVICE

(71) Applicant: Huawei Technologies Co., Ltd., Shenzhen (CN)

(72) Inventor: Youtuan Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 15/265,601

(22) Filed: Sep. 14, 2016

(65) Prior Publication Data

US 2017/0006551 A1    Jan. 5, 2017

Related U.S. Application Data

(63) Continuation of application No. PCT/CN2014/073503, filed on Mar. 17, 2014.

(51) Int. Cl.
| | |
|---|---|
| *H04W 52/12* | (2009.01) |
| *H04W 52/02* | (2009.01) |
| *H04W 52/22* | (2009.01) |
| *H04W 52/24* | (2009.01) |

(Continued)

(52) U.S. Cl.
CPC ............ *H04W 52/12* (2013.01); *H04L 5/006* (2013.01); *H04L 43/16* (2013.01); *H04W 52/0225* (2013.01); *H04W 52/225* (2013.01); *H04W 52/241* (2013.01); *Y02D 70/00* (2018.01); *Y02D 70/1262* (2018.01)

(58) Field of Classification Search
CPC ............ H04W 52/12; H04W 52/0225; H04W 52/241; H04W 52/225; H04L 43/16; H04L 5/006; Y02D 70/00; Y02D 70/1262
See application file for complete search history.

(56) References Cited

U.S. PATENT DOCUMENTS

| | | | |
|---|---|---|---|
| 7,693,099 B2 | 4/2010 | Gollamudi et al. | |
| 2005/0265250 A1* | 12/2005 | Gollamudi | H04L 1/1607 370/252 |
| 2006/0067276 A1 | 3/2006 | Bi et al. | |

(Continued)

FOREIGN PATENT DOCUMENTS

| | | |
|---|---|---|
| CN | 1411192 A | 4/2003 |
| CN | 1976248 A | 6/2007 |

(Continued)

*Primary Examiner* — Raj Jain
*Assistant Examiner* — Harry H Kim
(74) *Attorney, Agent, or Firm* — Slater Matsil, LLP (57) ABSTRACT

An outer loop power control method including determining, according to a target value of each control channel performance indicator of user equipment (UE) in each cell, a target value of at least one performance mapping indicator of the UE in each cell, acquiring a measured value of the at least one performance mapping indicator of the UE, determining a signal-to-noise ratio target value of the UE in each cell according to the target value of the at least one performance mapping indicator of the UE in each cell and the corresponding measured value of the performance mapping indicator, and performing outer loop power control on the UE in each cell according to the signal-to-noise ratio target value of the UE in each cell. The signal-to-noise ratio target value is controlled according to control channel quality.

12 Claims, 2 Drawing Sheets

(51) Int. Cl.
*H04L 12/26* (2006.01)
*H04L 5/00* (2006.01)

(56) References Cited

U.S. PATENT DOCUMENTS

| | | | | |
|---|---|---|---|---|
| 2006/0239224 A1* | 10/2006 | Borst | ............ | H04W 16/04 |
| | | | | 370/329 |
| 2010/0254445 A1 | 10/2010 | Andrews et al. | | |
| 2013/0072250 A1* | 3/2013 | Zhang | ............ | H04W 52/08 |
| | | | | 455/522 |
| 2014/0153427 A1* | 6/2014 | Seo | ............ | H04L 1/20 |
| | | | | 370/252 |

FOREIGN PATENT DOCUMENTS

| | | |
|---|---|---|
| CN | 101621316 A | 1/2010 |
| CN | 101743712 A | 6/2010 |
| WO | 2009003859 A2 | 1/2009 |
| WO | 2012135751 A1 | 10/2012 |

\* cited by examiner

OUTER LOOP POWER CONTROL METHOD, APPARATUS, AND DEVICE

CROSS-REFERENCE TO RELATED APPLICATIONS

This application is a continuation of International Application No. PCT/CN2014/073503, filed on Mar. 17, 2014, which is hereby incorporated by reference in its entirety.

TECHNICAL FIELD

Embodiments of the present invention relate to the field of communications technologies, and in particular, to an outer loop power control method, apparatus, and device.

BACKGROUND

In a Wideband Code Division Multiple Access (WCDMA) system, when user equipment UE performs a burst service, although a data activation probability is relatively low, fixed feedback needs to be performed in an uplink control channel of the user equipment UE, such as a dedicated physical control channel (DPCCH) and a high speed dedicated physical control channel (HS-DPCCH). As a result, a control channel in an uplink direction of an intelligent terminal occupies a relatively high uplink power overhead.

In a Long Term Evolution (LTE) system, an uplink control channel, for example, a physical uplink control channel (PUCCH), carries feedback of channel quality indicator (CQI) information of a downlink control channel, such as a physical downlink control channel (PDCCH). A base station eNodeB schedules resources according to CQI information fed back by user equipment UE. To obtain relatively optimal downlink scheduling performance, the UE needs to frequently feedback the CQI information. Therefore, the UE requires relatively high transmit power, which increases information power consumption, and further leads to a relatively high receive level on the PUCCH of the eNodeB, and causes interference to a neighboring cell.

Uplink control channel quality may be controlled by setting a signal-to-noise ratio target value (that is, a minimum signal-to-noise ratio). However, UE transmit power is controlled by using a method in which a signal-to-noise ratio is greater than the set signal-to-noise ratio target value; however, the signal-to-noise ratio target value varies greatly in different channel conditions, and because it is difficult to precisely perform channel identification, it is impossible to precisely set the signal-to-noise ratio target value to precisely control the uplink control channel quality. In addition, a relatively high signal-to-noise ratio target value needs to be set according to a worst channel condition. As a result, a waste of the UE transmit power is caused; a signal-to-noise ratio received by a base station is relatively high, which causing an increase in interference to a neighboring cell.

SUMMARY

Embodiments of the present invention provide an outer loop power control method, apparatus, and device, so as to address a problem in the prior art that control on a signal-to-noise ratio target value is imprecise.

According to a first aspect, an embodiment provides an outer loop power control method, including determining, according to a target value of each control channel performance indicator of user equipment UE in each cell, a target value of at least one performance mapping indicator of the UE in each cell, where the performance mapping indicator includes: a pilot signal bit error rate, a reference signal bit error rate, and a control channel reference measurement miss detection probability, and the control channel reference measurement miss detection probability is a ratio of a counted quantity of miss detection times to a total quantity of times in a preset time, where miss detection refers to that a case in which after a channel quality indicator CQI or an enhanced dedicated physical control channel E-DPCCH is decoded, a ratio of signal power to noise power is less than a set reference measurement threshold is not detected. The embodiment further includes acquiring a measured value of the at least one performance mapping indicator of the UE in each cell, determining a signal-to-noise ratio target value of the UE according to the target value of the at least one performance mapping indicator of the UE in each cell and the corresponding measured value of the performance mapping indicator, and performing outer loop power control on the UE according to the signal-to-noise ratio target value of the UE, so that after the outer loop power control, a measured value of the at least one performance mapping indicator reaches the corresponding target value of the performance mapping indicator.

With reference to the first aspect, in a first implementation manner of the first aspect, the determining, according to a target value of each control channel performance indicator of user equipment UE in each cell, a target value of at least one performance mapping indicator of the UE in each cell includes mapping a target value of a control channel performance indicator that is based on hard-decision demodulation to a target value of the pilot signal bit error rate or a target value of the reference signal bit error rate, or mapping a target value of a control channel performance indicator that is based on a decoding result to a target value of the control channel CCH reference measurement miss detection probability.

With reference to the first aspect or the first implementation manner of the first aspect, in a second implementation manner of the first aspect, the determining a signal-to-noise ratio target value of the UE according to the target value of the at least one performance mapping indicator of the UE in each cell and the corresponding measured value of the performance mapping indicator includes increasing the signal-to-noise ratio target value if a measured value of the pilot signal bit error rate or a measured value of the reference signal bit error rate is greater than the target value of the pilot signal bit error rate or the target value of the reference signal bit error rate, or increasing the signal-to-noise ratio target value if a measured value of the control channel reference measurement miss detection probability is greater than the target value of the control channel reference measurement miss detection probability, or decreasing the signal-to-noise ratio target value if a measured value of the pilot signal bit error rate or a measured value of the reference signal bit error rate is less than the target value of the pilot signal bit error rate or the target value of the reference signal bit error rate, and a measured value of the control channel reference measurement miss detection probability is less than the target value of the control channel reference measurement miss detection probability.

[Dow] With reference to the second implementation manner of the first aspect, in a third implementation manner of the first aspect, the method further includes adjusting the target value of the at least one performance mapping indicator according to measured values, of all control channel performance indicators, collected in a preset period.

With reference to the third implementation manner of the first aspect, in a fourth implementation manner of the first aspect, the adjusting the target value of the at least one performance mapping indicator according to measured values, of all control channel performance indicators, collected in a preset period includes, if a measured value of at least one control channel performance indicator is less than a first threshold, decreasing the target value of the at least one performance mapping indicator, or if a measured value of at least one control channel performance indicator is greater than a second threshold, increasing the target value of the at least one performance mapping indicator.

With reference to the first aspect or any one of the first to fourth implementation manners of the first aspect, in a fifth implementation manner of the first aspect, after the determining a signal-to-noise ratio target value of the UE according to the target value of the at least one performance mapping indicator of the UE in each cell and the corresponding measured value of the performance mapping indicator, the method further includes sending an indication indicating whether control channel performance is restricted.

With reference to the first aspect or any one of the first to fifth implementation manners of the first aspect, in a sixth implementation manner of the first aspect, before the method is executed, the method further includes determining that no data is to be sent by the UE on a dedicated channel DCH or an enhanced dedicated channel E-DCH in the preset period.

With reference to the first aspect or any one of the first to sixth implementation manners of the first aspect, in a seventh implementation manner of the first aspect, the determining a signal-to-noise ratio target value of the UE according to the target value of the at least one performance mapping indicator of the UE in each cell and the corresponding measured value of the performance mapping indicator, further includes determining a signal-to-noise ratio target value of each cell according to the target value of the at least one performance mapping indicator of the UE in each cell and the corresponding measured value of the performance mapping indicator, and determining the signal-to-noise ratio target value of the UE according to the signal-to-noise ratio target value of each cell.

According to a second aspect, an embodiment of the present invention provides an outer loop power control apparatus, including a mapping module, configured to determine, according to a target value of each control channel performance indicator of user equipment UE in each cell, a target value of at least one performance mapping indicator of the UE in each cell, where the performance mapping indicator includes: a pilot signal bit error rate, a reference signal bit error rate, and a control channel reference measurement miss detection probability, and the control channel reference measurement miss detection probability is a ratio of a counted quantity of miss detection times to a total quantity of times in a preset time, where miss detection refers to that a case in which after a channel quality indicator CQI or an enhanced dedicated physical control channel E-DPCCH is decoded, a ratio of signal power to noise power is less than a set reference measurement threshold is not detected. The apparatus further includes an acquiring module, configured to acquire a measured value of the at least one performance mapping indicator of the UE in each cell, and a determining module, configured to determine a signal-to-noise ratio target value of the UE according to the target value of the at least one performance mapping indicator of the UE in each cell and the corresponding measured value of the performance mapping indicator. The apparatus further includes a power control module, configured to perform outer loop power control on the UE according to the signal-to-noise ratio target value of the UE, so that after the outer loop power control, a measured value of the at least one performance mapping indicator reaches the corresponding target value of the performance mapping indicator.

With reference to the second aspect, in a first implementation manner of the second aspect, the mapping module is specifically configured to map a target value of a control channel performance indicator that is based on hard-decision demodulation to a target value of the pilot signal bit error rate or a target value of the reference signal bit error rate, or map a target value of a control channel performance indicator that is based on a decoding result to a target value of the control channel CCH reference measurement miss detection probability.

With reference to the second aspect or the first implementation manner of the second aspect, in a second implementation manner of the second aspect, the determining module is specifically configured to increase the signal-to-noise ratio target value if a measured value of the pilot signal bit error rate or a measured value of the reference signal bit error rate is greater than the target value of the pilot signal bit error rate or the target value of the reference signal bit error rate, or increase the signal-to-noise ratio target value if a measured value of the control channel reference measurement miss detection probability is greater than the target value of the control channel reference measurement miss detection probability, or decrease the signal-to-noise ratio target value if a measured value of the pilot signal bit error rate or a measured value of the reference signal bit error rate is less than the target value of the pilot signal bit error rate or the target value of the reference signal bit error rate, and a measured value of the control channel reference measurement miss detection probability is less than the target value of the control channel reference measurement miss detection probability.

With reference to the second implementation manner of the second aspect, in a third implementation manner of the second aspect, the determining module is further configured to adjust the target value of the at least one performance mapping indicator according to measured values, of all control channel performance indicators, collected in a preset period.

With reference to the third implementation manner of the second aspect, in a fourth implementation manner of the second aspect, the determining module is specifically configured to, if a measured value of at least one control channel performance indicator is less than a first threshold, decrease the target value of the at least one performance mapping indicator, or, if a measured value of at least one control channel performance indicator is greater than a second threshold, increase the target value of the at least one performance mapping indicator.

With reference to the second aspect or any one of the first to fourth implementation manners of the second aspect, in a fifth implementation manner of the second aspect, the apparatus further includes a sending module, configured to send, after the signal-to-noise ratio target value of the UE is determined according to the target value of the at least one performance mapping indicator of the UE in each cell and the corresponding measured value of the performance mapping indicator, an indication indicating whether control channel performance is restricted.

With reference to the second aspect or any one of the first to fifth implementation manners of the second aspect, in a sixth implementation manner of the second aspect, the determining module is further configured to determine that no data is to be sent by the UE on a dedicated channel DCH or an enhanced dedicated channel E-DCH in the preset period.

With reference to the second aspect or any one of the first to sixth implementation manners of the second aspect, in a seventh implementation manner of the second aspect, the determining module is specifically configured to determine a signal-to-noise ratio target value of each cell according to the target value of the at least one performance mapping indicator of the UE in each cell and the corresponding measured value of the performance mapping indicator, and determine the signal-to-noise ratio target value of the UE according to the signal-to-noise ratio target value of each cell.

According to a third aspect, an embodiment of the present invention provides a base station, including a transmitter, a receiver, a processor and a memory, where the transmitter is configured to send data information or an indication message, the receiver is configured to receive a measured value of at least one performance mapping indicator of a pilot signal bit error rate, a reference signal bit error rate, or a control channel reference measurement miss detection probability or other information, and the memory is configured to store an execution instruction; when the base station runs, the processor communicates with the memory; and the processor executes the execution instruction, so that the base station executes the method according to the first aspect, or any one of the first to seventh implementation manners of the first aspect.

According to a fourth aspect, an embodiment of the present invention provides an outer loop power control device, including a processor and a memory, where the memory stores an execution instruction; when the outer loop power control device runs, the processor communicates with the memory, and the processor executes the execution instruction, so that the outer loop power control device executes the method according to the first aspect, or any one of the first to seventh implementation manners of the first aspect.

According to the outer loop power control method, apparatus, and device in the embodiments of the present invention, a target value of a control channel performance indicator of UE in each cell is mapped to a target value of at least one performance mapping indicator of a pilot signal bit error rate, a reference signal bit error rate, or a control channel reference measurement miss detection probability, to acquire a measured value of the at least one performance mapping indicator; a signal-to-noise ratio target value of a control channel is adjusted according to the target value of the at least one performance mapping indicator and the measured value of the at least one performance mapping indicator; and outer loop power control is performed according to the signal-to-noise ratio target value, so that after the outer loop power control, a measured value of the at least one performance mapping indicator reaches the corresponding target value of the performance mapping indicator. This implements control on the signal-to-noise ratio target value according to control channel performance, increases precision of controlling the signal-to-noise ratio target value, and solves a problem in the prior art that the control on the signal-to-noise ratio target value is imprecise.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
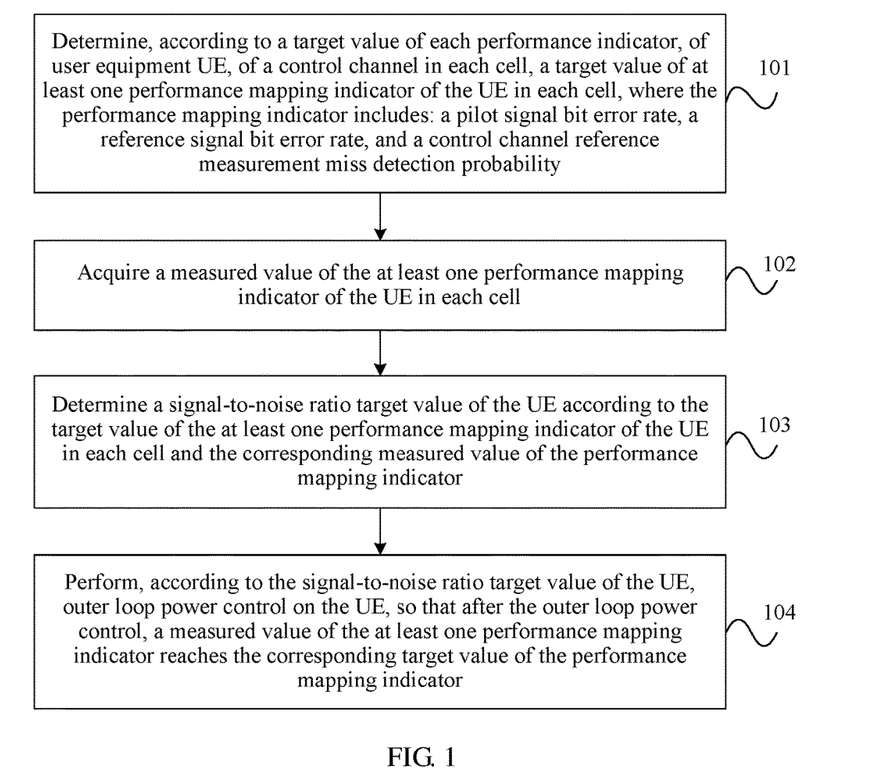
FIG. 1 is a flowchart of Embodiment 1 of an outer loop power control method according to the present invention.

FIG. 1 is a flowchart of Embodiment 1 of an outer loop power control method according to the present invention. This embodiment may be executed by an outer loop power control apparatus, where the apparatus may be implemented by using software, or be implemented by using hardware, or further be implemented by using a combination of software and hardware. The apparatus may be located in a base station or a controller. As shown in FIG. 1, the method in this embodiment may include:

Step 101: Determine, according to a target value of each control channel performance indicator of user equipment UE in each cell, a target value of at least one performance mapping indicator of the UE in each cell, where the performance mapping indicator includes: a pilot signal bit error rate, a reference signal bit error rate, and a control channel reference measurement miss detection probability, and the control channel reference measurement miss detection probability is a ratio of a counted quantity of miss detection times to a total quantity of times in a preset time, where miss detection refers to that a case in which after a channel quality indicator CQI or an enhanced dedicated physical control channel E-DPCCH is decoded, a ratio of signal power to noise power is less than a set reference measurement threshold is not detected.

Specifically, the control channel CCH performance indicator of the user equipment UE in each cell mainly includes two parts: a performance indicator of demodulation and a performance indicator of decoding miss detection at a specific false alarm probability.

An uplink CCH performance indicator of WCDMA may include but is not limited to the following: a pilot signal bit error rate, a transmit power control (TPC) bit error rate, an HS-DPCCH CQI block error rate, an ACK false detection/ miss detection/false alarm probability, an enhanced dedicated physical control channel (E-DPCCH) false detection/miss detection/false alarm probability, and the like.

An uplink PUCCH performance indicator of LTE may include but is not limited to: a reference signal bit error rate, miss detection/false detection/false alarm probabilities of PUCCHs in different formats, and the like.

In a WCDMA system, a control channel performance indicator that is based on hard-decision demodulation, such as a pilot signal bit error rate and a TPC bit error rate, may be separately mapped to an indicator: the pilot signal bit error rate; a control channel performance indicator that is based on a decoding result, such as a CQI block error rate, an ACK false detection/miss detection/false alarm probability, and an E-DPCCH false detection/miss detection/false alarm probability, may be separately mapped to an indicator: a control channel reference measurement miss detection probability. For example, a mapping relationship between indicators may be obtained by using an offline simulation method, for example, a TPC bit error rate of 1% is mapped to a pilot signal bit error rate of A %, and a pilot signal bit error rate is directly mapped to the pilot signal bit error rate; or a CQI block error rate of 1% is mapped to a control channel reference measurement miss detection probability of B %; where A and B herein are respectively, for example, 2 and 3. It should be noted that, this description is merely exemplary, and this embodiment of the present invention is not limited thereto.

Similarly, in an LTE system, each control channel performance indicator that is based on hard-decision demodulation may be separately mapped to a reference signal bit error rate; a control channel performance indicator that is based on a decoding result, such as a miss detection/false detection/false alarm probability of PUCCHs in different formats, may be separately mapped to a control channel reference measurement miss detection probability. For example, a mapping relationship between indicators may be obtained by using an offline simulation method, for example, a reference signal bit error rate is directly mapped to the reference signal bit error rate, and a PUCCH miss detection probability of 1% is mapped to a control channel reference measurement miss detection probability of B %, where A and B herein are respectively, for example, 2 and 3. It should be noted that, this description is merely exemplary, and this embodiment of the present invention is not limited thereto.

In the WCDMA system, the control channel reference measurement miss detection probability may be obtained in the following manner: after a CQI or an E-DPCCH that is encoded by using RM is decoded by means of maximum likelihood, a ratio of signal power to noise power is collected; if the ratio is less than a set reference measurement threshold, it is considered that there is miss detection in reference measurement; the miss detection probability may be obtained by calculating a ratio of a quantity of miss detection times to a total quantity of times in a set time.

In the LTE system, the control channel reference measurement miss detection probability may be obtained in the following manner: after a CQI that is encoded by using RM is decoded by means of maximum likelihood, a ratio of signal power to noise power is collected; if the ratio is less than a set reference measurement threshold, it is considered that there is miss detection in reference measurement; the miss detection probability may be obtained by calculating a ratio of a quantity of miss detection times to a total quantity of times in a set time.

A value of the reference measurement threshold may be different in the foregoing two systems.

Because mapping relationships between the control channel performance indicator of the UE in each cell and the indicators: the pilot signal bit error rate, the reference signal bit error rate, and the control channel reference measurement miss detection probability may be obtained, a target value of at least one performance mapping indicator of the pilot signal bit error rate, the reference signal bit error rate, or the control channel reference measurement miss detection probability may be determined according to the target value of the control channel performance indicator of the UE in each cell and a corresponding mapping relationship.

For example, the mapping relationship between the target value of the control channel performance indicator of each cell and the target value of the at least one performance mapping indicator of the pilot signal bit error rate, the reference signal bit error rate, or the control channel reference measurement miss detection probability may be obtained by using an offline simulation method, The mapping relationship between the target value of each performance indicator and the foregoing target value of the at least one performance mapping indicator may be as follows: for example, a target value 0.5% of a TPC bit error rate is mapped to a target value 1% of a pilot signal bit error rate; a target value 1% of a CQI block error rate is mapped to a target value 2% of a control channel reference measurement miss detection probability; a target value 0.5% of a PUCCH miss detection probability is mapped to a target value 1% of a control channel reference measurement miss detection probability. It should be noted that, this description is merely exemplary, and this embodiment of the present invention is not limited thereto.

Step 102: Acquire a measured value of the at least one performance mapping indicator of the pilot signal bit error rate, the reference signal bit error rate, or the control channel reference measurement miss detection probability of the UE in each cell.

Step 103: Determine a signal-to-noise ratio target value of the UE according to the target value of the at least one performance mapping indicator of the UE in each cell acquired in step 101 and the corresponding measured value of the performance mapping indicator acquired in step 102.

Step 104: Perform outer loop power control on the UE according to the signal-to-noise ratio target value of the UE, so that after the outer loop power control, a measured value of the at least one performance mapping indicator of the pilot signal bit error rate, the reference signal bit error rate, or the control channel reference measurement miss detection probability reaches the corresponding target value of the performance mapping indicator.

Specifically, the foregoing measured value of the at least one performance mapping indicator is acquired to compare with the target value of each performance mapping indicator; the signal-to-noise ratio target value of a control channel, of the UE, in each cell is adjusted; and the outer loop power control is performed according to an adjusted signal-to-noise ratio target value. This can ensure that uplink control channel performance, that is, received quality reaches a set target value, and in addition, reduces a control channel receive signal-to-noise ratio of the UE in each cell, reduces UE transmit power, and reduces uplink interference.

In this embodiment, a target value of a control channel performance indicator of UE in each cell is mapped to a target value of at least one performance mapping indicator of a pilot signal bit error rate, a reference signal bit error rate, or a control channel reference measurement miss detection probability, to acquire a measured value of the at least one performance mapping indicator; a signal-to-noise ratio target value of a control channel is adjusted according to the target value of the at least one performance mapping indicator and the measured value of the at least one performance mapping indicator; outer loop power control is performed according to the signal-to-noise ratio target value, so that after the outer loop power control, a measured value of the at least one performance mapping indicator reaches the corresponding target value of the least one performance mapping indicator. This implements control on the signal-to-noise ratio target value according to control channel performance, increases precision of controlling the signal-to-noise ratio target value, and solves a problem in the prior art that the control on the signal-to-noise ratio target value is imprecise.

In Embodiment 2 of an outer loop power control method of the present invention, on a basis of the method in the embodiment shown in FIG. 1, in the method of this embodiment, the determining, according to a target value of each control channel performance indicator of user equipment UE in each cell, a target value of at least one performance mapping indicator of the UE in each cell in the following: a pilot signal bit error rate, a reference signal bit error rate, or a control channel reference measurement miss detection probability includes mapping a target value of a control channel performance indicator that is based on hard-decision demodulation to a target value of the pilot signal bit error rate or a target value of the reference signal bit error rate; or mapping a target value of a control channel performance indicator that is based on a decoding result to a target value of the control channel reference measurement miss detection probability.

Specifically, in a WCDMA system, a target value of a control channel performance indicator that is based on hard-decision demodulation, such as a pilot signal bit error rate and a TPC bit error rate, may be separately mapped to a target value of an indicator: the pilot signal bit error rate; a target value of a control channel performance indicator that is based on a decoding result, such as a CQI block error rate, an ACK false detection/miss detection/false alarm probability, and an E-DPCCH false detection/miss detection/false alarm probability, may be separately mapped to a target value of an indicator: a control channel reference measurement miss detection probability. For example, a mapping relationship between target values of all indicators may be obtained by using an offline simulation method, for example, a target value 0.5% of a TPC bit error rate is mapped to a target value 1% of a pilot signal bit error rate, and a target value of a pilot signal bit error rate is directly mapped to the target value of the pilot signal bit error rate; or a target value 1% of a CQI block error rate is mapped to a target value 2% of a control channel reference measurement miss detection probability. It should be noted that, this description is merely exemplary, and this embodiment of the present invention is not limited thereto.

In an LTE system, a target value of each control channel performance indicator that is based on hard-decision demodulation may be separately mapped to a target value of a reference signal bit error rate; a target value of a control channel performance indicator that is based on a decoding result, such as a miss detection/false detection/false alarm probability of PUCCHs in different formats, may be separately mapped to a target value of a control channel reference measurement miss detection probability. For example, a mapping relationship between target values of all indicators may be obtained by using an offline simulation method, for example, a target value of a reference signal bit error rate is directly mapped to the target value of the reference signal bit error rate; a target value 0.5% of a PUCCH miss detection probability is mapped to a target value 1% of a control channel reference measurement miss detection probability. It should be noted that, this description is merely exemplary, and this embodiment of the present invention is not limited thereto.

Optionally, the determining a signal-to-noise ratio target value of the UE according to the target value of the at least one performance mapping indicator of the UE in each cell acquired in step 101 and the corresponding measured value of the performance mapping indicator acquired in step 102 includes increasing the signal-to-noise ratio target value if a measured value of the pilot signal bit error rate or a measured value of the reference signal bit error rate is greater than the target value of the pilot signal bit error rate or the target value of the reference signal bit error rate, or increasing the signal-to-noise ratio target value if a measured value of the control channel reference measurement miss detection probability is greater than the target value of the control channel reference measurement miss detection probability, or decreasing the signal-to-noise ratio target value if a measured value of the pilot signal bit error rate or a measured value of the reference signal bit error rate is less than the target value of the pilot signal bit error rate or the target value of the reference signal bit error rate, and a measured value of the control channel reference measurement miss detection probability is less than the target value of the control channel reference measurement miss detection probability.

Specifically, in the WCDMA system, the signal-to-noise ratio target value may be adjusted according to the measured values and the target values of the pilot signal bit error rate and the control channel reference measurement miss detection probability in the following manner: The measured values of the pilot signal bit error rate and the control channel reference measurement miss detection probability are respectively compared with thresholds, that is, the target values of the pilot signal bit error rate and the control channel reference measurement miss detection probability; if the value of the pilot signal bit error rate is greater than the target value of the indicator or the value of the control channel reference measurement miss detection probability is greater than the target value of the indicator, it indicates that, in this case, the control channel performance, that is, uplink received quality is poor, and the signal-to-noise ratio target value needs to be increased, that is, may be increased by one step, where the step may be preset; if the value of the pilot signal bit error rate is less than the target value of the indicator and the value of the control channel reference measurement miss detection probability is less than the target value of the indicator, it indicates that, in this case, the control channel performance, that is, the uplink received quality is good, and the signal-to-noise ratio target value needs to be decreased, that is, may be decreased by one step.

In the LTE system, the signal-to-noise ratio target value may be adjusted according to the measured values and the target values of the reference signal bit error rate and the control channel reference measurement miss detection probability in the following manner: The measured values of the reference signal bit error rate and the control channel reference measurement miss detection probability are respectively compared with thresholds, that is, the target values of the reference signal bit error rate and the control channel reference measurement miss detection probability; if the value of the reference signal bit error rate is greater than the target value of the indicator or the value of the control channel reference measurement miss detection probability is greater than the target value of the indicator, it indicates that, in this case, the control channel performance, that is, uplink received quality is poor, and the signal-to-noise ratio target value needs to be increased, that is, may be increased by one step, where the step may be preset; if the value of the reference signal bit error rate is less than the target value of the indicator and the value of the control channel reference measurement miss detection probability is less than the target value of the indicator, it indicates that, in this case, the control channel performance, that is, the uplink received quality is good, and the signal-to-noise ratio target value needs to be decreased, that is, may be decreased by one step.

Optionally, the method in this embodiment may further include adjusting the target value of the at least one performance mapping indicator according to measured values, of all control channel performance indicators, collected in a preset period, where the performance mapping indicator includes: the pilot signal bit error rate, the reference signal bit error rate, and the control channel reference measurement miss detection probability; each control channel performance indicator may be obtained in multiple manners, for example: an E-DPCCH miss detection probability is obtained by calculating a Radio Link Control RLC layer retransmission probability in the preset period; an HS-DPCCH CQI block error rate is obtained according to a probability of a decision that a channel quality indicator CQI is unreliable; an ACK miss detection probability is obtained according to a probability that the user equipment UE sends a dedicated control channel HS-DPCCH ACK in uplink but a receive end determines that the UE does not send the ACK. This description is merely exemplary, and this embodiment of the present invention is not limited thereto.

The adjusting the target value of the at least one performance mapping indicator according to measured values, of all control channel performance indicators, collected in a preset period may be, if a measured value of at least one control channel performance indicator is less than a first threshold, decreasing the target value of the at least one performance mapping indicator, for example, if a measured value of the CQI block error rate is less than a threshold 2%, a target value of a performance mapping indicator that has a mapping relationship with this performance indicator, that is, the control channel reference measurement miss detection probability, may be decreased, or if a measured value of at least one control channel performance indicator is greater than a second threshold, increasing the target value of the at least one performance mapping indicator, for example, if a measured value of the CQI block error rate is greater than a threshold 3%, a target value of a performance mapping indicator that has a mapping relationship with this performance indicator, that is, the control channel reference measurement miss detection probability, may be increased.

Optionally, after the determining a signal-to-noise ratio target value of the UE according to the target value of the at least one performance mapping indicator of the pilot signal bit error rate, the reference signal bit error rate, or the control channel reference measurement miss detection probability and the corresponding measured value of the performance mapping indicator, the method in this embodiment may further include sending an indication indicating whether control channel performance is restricted.

For example, an indication indicating that the control channel performance is restricted is sent if the measured value of the pilot signal bit error rate or the measured value of the reference signal bit error rate is greater than the target value of the pilot signal bit error rate or the target value of the reference signal bit error rate, or the measured value of the control channel reference measurement miss detection probability is greater than the target value of the control channel reference measurement miss detection probability, or an indication indicating that the control channel performance is unrestricted is sent if the measured value of the pilot signal bit error rate or the measured value of the reference signal bit error rate is less than the target value of the pilot signal bit error rate or the target value of the reference signal bit error rate, and the measured value of the control channel reference measurement miss detection probability is less than the target value of the control channel reference measurement miss detection probability.

For another example, if the signal-to-noise ratio target value is increased, it indicates that, in this case, the control channel performance, that is, uplink received quality is poor, and the indication indicating that the control channel performance is restricted is sent, or, if the signal-to-noise ratio target value is decreased, it indicates that, in this case, the control channel performance, that is, uplink received quality is good, and the indication indicating that the control channel performance is unrestricted is sent.

In this embodiment, a signal-to-noise ratio target value of UE is determined according to a target value of at least one performance mapping indicator and a measured value of the at least one performance mapping indicator, if the measured value of the at least one performance mapping indicator is greater than the respective target value of this performance mapping indicator, the signal-to-noise ratio target value is increased; if a measured value of a pilot signal bit error rate or a measured value of a reference signal bit error rate is less than a respective target value of the performance mapping indicators, and a measured value of a control channel reference measurement miss detection probability is less than a target value of this performance mapping indicator, the signal-to-noise ratio target value is decreased; further, the target values of the foregoing performance mapping indicators may be adjusted according to performance, of a control channel, obtained by statistics collection. This implements control on the signal-to-noise ratio target value according to control channel performance, increases precision of controlling the signal-to-noise ratio target value, and solves a problem in the prior art that the control on the signal-to-noise ratio target value is imprecise.

In Embodiment 3 of an outer loop power control method of the present invention, on a basis of method Embodiments 1 and 2, before the method of this embodiment is executed, the method further includes determining that no data is to be sent by UE on a dedicated channel DCH or an enhanced dedicated channel E-DCH in a preset period.

Specifically, this embodiment is dedicated for non-soft handover UE, where the non-soft handover UE has only one serving cell. When no data is to be sent on the dedicated channel (DCH) or the enhanced dedicated channel (E-DCH) in the preset period, a signal-to-noise ratio target value of the UE is determined according to the following steps, to perform outer loop power control, determining, according to a target value of each control channel performance indicator of UE in a serving cell with a DCH or an E-DCH, a target value of at least one performance mapping indicator of the UE in the serving cell. The performance mapping indicator includes a pilot signal bit error rate, a reference signal bit error rate, and a control channel reference measurement miss detection probability, and the control channel reference measurement miss detection probability is a ratio of a counted quantity of miss detection times to a total quantity of times in a preset time, where miss detection refers to that a case in which after a channel quality indicator CQI or an enhanced dedicated physical control channel E-DPCCH is decoded, a ratio of signal power to noise power is less than a set reference measurement threshold is not detected. The embodiment further includes acquiring a measured value of the at least one performance mapping indicator of the pilot signal bit error rate, the reference signal bit error rate, or the control channel reference measurement miss detection probability of the UE in the serving cell, determining the signal-to-noise ratio target value of the UE according to the target value of the at least one performance mapping indicator of the UE in the serving cell and the corresponding measured value of the performance mapping indicator, and performing outer loop power control on the UE according to the signal-to-noise ratio target value of the UE, so that after the outer loop power control, a measured value of the foregoing at least one performance mapping indicator reaches the corresponding target value of the performance mapping indicator.

That is, the outer loop power control is performed by using the methods described in method Embodiments 1 and 2.

After data is received on the DCH or the E-DCH for the first time, the signal-to-noise ratio target value is adjusted according to uplink received quality of the DCH or the E-DCH, to perform DCH or E-DCH outer loop power control. That is, outer loop power control performed according to control channel performance is changed to outer loop power control performed according to DCH or E-DCH quality. During a period with only a CCH, the signal-to-noise ratio target value is adjusted by using only a CCH performance requirement, which can effectively reduce CCH uplink transmit power, decrease an uplink overhead, and increase an uplink capacity.

Optionally, in the method of this embodiment, in a period of the DCH or E-DCH outer loop power control, if an indication, sent by the serving cell, indicating that the control channel performance is restricted is acquired, the signal-to-noise ratio target value is increased in the DCH or E-DCH outer loop power control; before a next indication indicating that the control channel performance is unrestricted is received from the serving cell, the signal-to-noise ratio target value is not decreased in the DCH or E-DCH outer loop power control.

Optionally, the determining the signal-to-noise ratio target value of the UE according to the target value of the at least one performance mapping indicator of the UE in each cell and the corresponding measured value of the performance mapping indicator includes determining a signal-to-noise ratio target value of each cell according to the target value of the at least one performance mapping indicator, of the UE in each cell, of the pilot signal bit error rate, the reference signal bit error rate, or the control channel reference measurement miss detection probability and the corresponding measured value of the performance mapping indicator, and determining the signal-to-noise ratio target value of the UE according to the signal-to-noise ratio target value of each cell.

Specifically, for the non-soft handover UE, the signal-to-noise ratio target value of the serving cell is determined according to the target value of the at least one performance mapping indicator, of the UE in the serving cell, of the pilot signal bit error rate, the reference signal bit error rate, and the control channel reference measurement miss detection probability and the corresponding measured value of the performance mapping indicator, and the signal-to-noise ratio target value of the UE is determined according to the signal-to-noise ratio target value of the serving cell.

In this embodiment, during a period with data of only a control channel, a signal-to-noise ratio target value is adjusted by using only control channel performance. After data is received on a DCH or an E-DCH for the first time, the signal-to-noise ratio target value is adjusted according to DCH or E-DCH uplink received quality, to perform DCH or E-DCH outer loop power control, which can effectively reduce CCH transmit power, decrease an uplink overhead, and increase an uplink capacity.

In Embodiment 4 of an outer loop power control method of the present invention, on a basis of method Embodiments 1 and 2, before the method of this embodiment is executed, the method further includes determining that no data is to be sent by UE on a dedicated channel DCH or an enhanced dedicated channel E-DCH in a preset period.

Specifically, this embodiment is dedicated for soft handover UE, where the soft handover UE includes multiple servicing cells (a primary serving cell and a secondary serving cell) with a DCH or an E-DCH. When no data is to be sent on the dedicated channel (DCH) or the enhanced dedicated channel (E-DCH) in the preset period, a signal-to-noise ratio target value of the UE is determined according to the following steps, to perform outer loop power control determining, according to a target value of each control channel performance indicator of the UE in at least one serving cell with a DCH or an E-DCH, a target value of at least one performance mapping indicator of the UE in the at least one serving cell, where the performance mapping indicator includes: a pilot signal bit error rate, a reference signal bit error rate, and a control channel reference measurement miss detection probability, and the control channel reference measurement miss detection probability is a ratio of a counted quantity of miss detection times to a total quantity of times in a preset time, where miss detection refers to that a case in which after a channel quality indicator CQI or an enhanced dedicated physical control channel E-DPCCH is decoded, a ratio of signal power to noise power is less than a set reference measurement threshold is not detected, acquiring a measured value of the at least one performance mapping indicator of the pilot signal bit error rate, the reference signal bit error rate, or the control channel reference measurement miss detection probability of the UE in the at least one serving cell, determining the signal-to-noise ratio target value of the UE according to the target value of the at least one performance mapping indicator of the UE in the at least one serving cell and the corresponding measured value of the performance mapping indicator, and performing outer loop power control on the UE according to the signal-to-noise ratio target value of the UE, so that after the outer loop power control, a measured value of the foregoing at least one performance mapping indicator reaches the corresponding target value of the performance mapping indicator.

One or more cells with best control channel performance, that is, best uplink received quality may be selected as the foregoing at least one serving cell.

That is, the outer loop power control is performed by using the methods described in method Embodiments 1 and 2.

After data is received on the DCH or the E-DCH for the first time, the signal-to-noise ratio target value is adjusted according to uplink received quality of the DCH or the E-DCH, to perform DCH or E-DCH outer loop power control. That is, outer loop power control performed according to control channel performance is changed to outer loop power control performed according to DCH or E-DCH quality. During a period with only a CCH, the signal-to-noise ratio target value is adjusted by using only a CCH performance requirement, which can effectively reduce CCH uplink transmit power, decrease an uplink overhead, and increase an uplink capacity.

For the soft handover UE, further, only the target value of the at least one performance mapping indicator of the pilot signal bit error rate, the reference signal bit error rate, or the control channel reference measurement miss detection probability in the primary serving cell with the DCH or the E-DCH and the corresponding measured value of the performance mapping indicator may be acquired, and an indication indicating whether control channel performance of a secondary serving cell with a DCH or an E-DCH is restricted may be acquired, and a signal-to-noise ratio target value of a control channel of the UE in a primary serving cell is determined according to the foregoing indication indicating whether the control channel performance of the secondary serving cell is restricted, a target value of at least one performance mapping indicator of the primary serving cell, and a corresponding measured value of the performance mapping indicator.

For example, if the secondary serving cell sends an indication indicating that the control channel performance is restricted, and in this case, it may also be determined that the signal-to-noise ratio target value may be decreased according to the target value of the at least one performance mapping indicator of the pilot signal bit error rate, the reference signal bit error rate, or the control channel reference measurement miss detection probability of the primary serving cell, and the corresponding measured value of the performance mapping indicator, the signal-to-noise ratio target value of the control channel of the UE in the primary serving cell is decreased, to decrease interference to the secondary serving cell.

Optionally, in the method of this embodiment, in a period of the DCH or E-DCH outer loop power control, if the indication, sent by the at least one serving cell, indicating that the control channel performance is restricted is acquired, the signal-to-noise ratio target value is increased in the DCH or E-DCH outer loop power control; before a next indication indicating that the control channel performance is unrestricted is received from the at least one serving cell, the signal-to-noise ratio target value is not decreased in the DCH or E-DCH outer loop power control.

Optionally, the determining the signal-to-noise ratio target value of the UE according to the target value of the at least one performance mapping indicator of the UE in each cell and the corresponding measured value of the performance mapping indicator includes determining a signal-to-noise ratio target value of each cell according to the target value of the at least one performance mapping indicator, of the UE in each cell, of the pilot signal bit error rate, the reference signal bit error rate, or the control channel reference measurement miss detection probability and the corresponding measured value of the performance mapping indicator, and determining the signal-to-noise ratio target value of the UE according to the signal-to-noise ratio target value of each cell.

Specifically, for the soft handover UE, the signal-to-noise ratio target value of the at least one serving cell is determined according to the target value of the at least one performance mapping indicator, of the UE in the at least one serving cell, of the pilot signal bit error rate, the reference signal bit error rate, and the control channel reference measurement miss detection probability and the corresponding measured value of the performance mapping indicator; and the signal-to-noise ratio target value of the UE is determined according to the signal-to-noise ratio target value of the at least one serving cell.

In this embodiment, during a period with data of only a control channel, a signal-to-noise ratio target value is adjusted by using only control channel performance. After data is received on a DCH or an E-DCH for the first time, the signal-to-noise ratio target value is adjusted according to DCH or E-DCH uplink received quality, to perform DCH or E-DCH outer loop power control, which can effectively reduce CCH transmit power, decrease an uplink overhead, and increase an uplink capacity.

Figure 2:
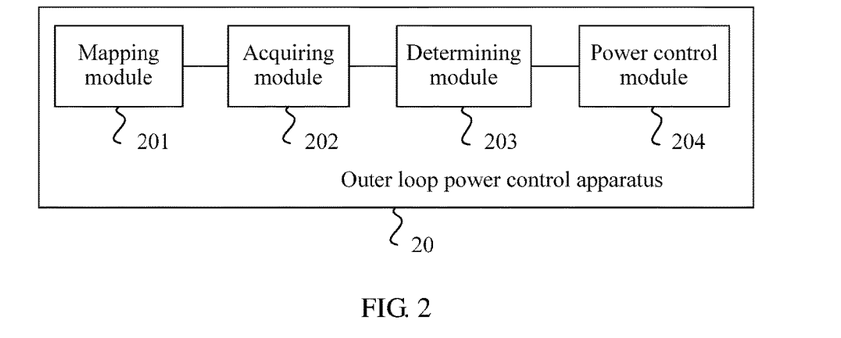
FIG. 2 is a schematic structural diagram of Embodiment 1 of an outer loop power control apparatus according to the present invention.

FIG. 2 is a schematic structural diagram of Embodiment 1 of an outer loop power control apparatus according to the present invention. As shown in FIG. 2, an outer loop power control apparatus 20 in this embodiment may be disposed in a base station or a controller, and may include: a mapping module 201, an acquiring module 202, a determining module 203, and a power control module 204. The mapping module 201 is configured to determine, according to a target value of each control channel performance indicator of user equipment UE in each cell, a target value of at least one performance mapping indicator of the UE in each cell, where the performance mapping indicator includes: a pilot signal bit error rate, a reference signal bit error rate, and a control channel reference measurement miss detection probability, and the control channel reference measurement miss detection probability is a ratio of a counted quantity of miss detection times to a total quantity of times in a preset time, where miss detection refers to that a case in which after a channel quality indicator CQI or an enhanced dedicated physical control channel E-DPCCH is decoded, a ratio of signal power to noise power is less than a set reference measurement threshold is not detected. The acquiring module 202 is configured to acquire a measured value of the at least one performance mapping indicator of the UE in each cell. The determining module 203 is configured to determine a signal-to-noise ratio target value of the UE according to the target value of the at least one performance mapping indicator of the UE in each cell and the corresponding measured value of the performance mapping indicator. The power control module 204 is configured to perform outer loop power control on the UE according to the signal-to-noise ratio target value of the UE, so that after the outer loop power control, a measured value of the at least one performance mapping indicator reaches the corresponding target value of the performance mapping indicator.

The apparatus in this embodiment may be used to execute the technical solution in the method embodiment shown in FIG. 1, and implementation principles and technical effects thereof are similar, and details are not described herein again.

Figure 3:
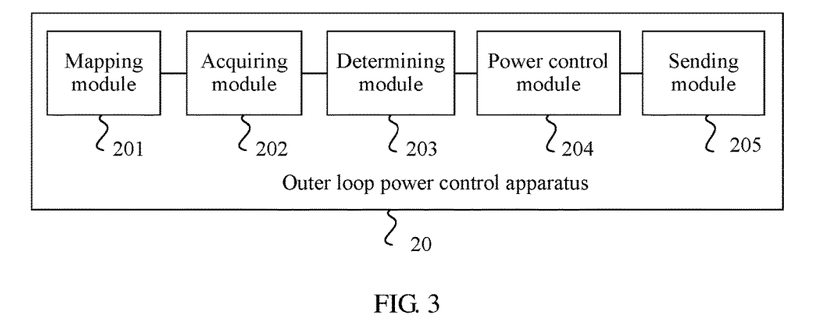
FIG. 3 is a schematic structural diagram of Embodiment 2 of an outer loop power control apparatus according to the present invention.

FIG. 3 is a schematic structural diagram of Embodiment 2 of an outer loop power control apparatus according to the present invention. As shown in FIG. 3, the apparatus in this embodiment is based on the apparatus structure shown in FIG. 2. Further, the mapping module 201 is specifically configured to map a target value of a control channel performance indicator that is based on hard-decision demodulation to a target value of the pilot signal bit error rate or a target value of the reference signal bit error rate, or map a target value of a control channel performance indicator that is based on a decoding result to a target value of the control channel CCH reference measurement miss detection probability.

Optionally, the determining module 203 is specifically configured to increase the signal-to-noise ratio target value if a measured value of the pilot signal bit error rate or a measured value of the reference signal bit error rate is greater than the target value of the pilot signal bit error rate or the target value of the reference signal bit error rate, or increase the signal-to-noise ratio target value if a measured value of the control channel reference measurement miss detection probability is greater than the target value of the control channel reference measurement miss detection probability, or decrease the signal-to-noise ratio target value if a measured value of the pilot signal bit error rate or a measured value of the reference signal bit error rate is less than the target value of the pilot signal bit error rate or the target value of the reference signal bit error rate, and a measured value of the control channel reference measurement miss detection probability is less than the target value of the control channel reference measurement miss detection probability.

Optionally, the determining module 203 is further configured to adjust the target value of the at least one performance mapping indicator according to measured values, of all control channel performance indicators, collected in a preset period.

Optionally, the determining module 203 is specifically configured to if a measured value of at least one control channel performance indicator is less than a first threshold, decrease the target value of the at least one performance mapping indicator, or if a measured value of at least one control channel performance indicator is greater than a second threshold, increase the target value of the at least one performance mapping indicator.

Optionally, the apparatus in this embodiment may further include a sending module 205, configured to, after the signal-to-noise ratio target value of the UE is determined according to the target value of the at least one performance mapping indicator of the UE in each cell and the corresponding measured value of the performance mapping indicator, send an indication indicating whether control channel performance is restricted.

Optionally, the determining module 203 is further configured to determine that no data is to be sent by the UE on a dedicated channel DCH or an enhanced dedicated channel E-DCH in the preset period before the methods in method Embodiments 1 and 2 are executed.

Optionally, the determining module 203 is specifically configured to determine a signal-to-noise ratio target value of each cell according to the target value of the at least one performance mapping indicator of the UE in each cell and the corresponding measured value of the performance mapping indicator, and determine the signal-to-noise ratio target value of the UE according to the signal-to-noise ratio target value of each cell.

The apparatus in this embodiment may be used to execute the technical solutions in method Embodiments 2 and 3, and implementation principles and technical effects thereof are similar, and details are not described herein again.

Figure 4:
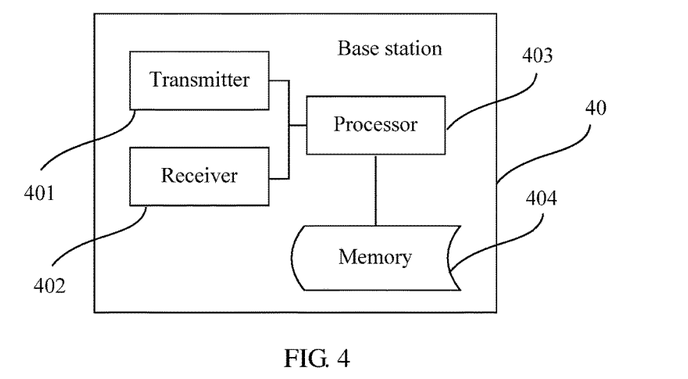
FIG. 4 is a schematic structural diagram of Embodiment 1 of a base station according to the present invention.

FIG. 4 is a schematic structural diagram of Embodiment 1 of a base station according to the present invention. As shown in FIG. 4, a base station 40 provided in this embodiment includes a transmitter 401, a receiver 402, a processor 403, and a memory 404. The transmitter is configured to send data information or an indication message. The receiver is configured to receive a measured value of at least one performance mapping indicator of a pilot signal bit error rate, a reference signal bit error rate, or a control channel reference measurement miss detection probability or other information. The memory stores an execution indication. When the base station runs, the processor communicates with the memory, and the processor executes the execution instruction, so that the base station executes the following method. The method includes determining, according to a target value of each control channel performance indicator of user equipment UE in each cell, a target value of at least one performance mapping indicator of the UE in each cell, where the performance mapping indicator includes: a pilot signal bit error rate, a reference signal bit error rate, and a control channel reference measurement miss detection probability, and the control channel reference measurement miss detection probability is a ratio of a counted quantity of miss detection times to a total quantity of times in a preset time, where miss detection refers to that a case in which after a channel quality indicator CQI or an enhanced dedicated physical control channel E-DPCCH is decoded, a ratio of signal power to noise power is less than a set reference measurement threshold is not detected, acquiring a measured value of the at least one performance mapping indicator of the UE in each cell, determining a signal-to-noise ratio target value of the UE according to the target value of the at least one performance mapping indicator of the UE in each cell and the corresponding measured value of the performance mapping indicator, and performing outer loop power control on the UE according to the signal-to-noise ratio target value of the UE, so that after the outer loop power control, a measured value of the at least one performance mapping indicator reaches the corresponding target value of the performance mapping indicator.

The base station in this embodiment may be configured to execute the technical solution in any method embodiment, and implementation principles and technical effects thereof are similar, and details are not described herein again.

Figure 5:
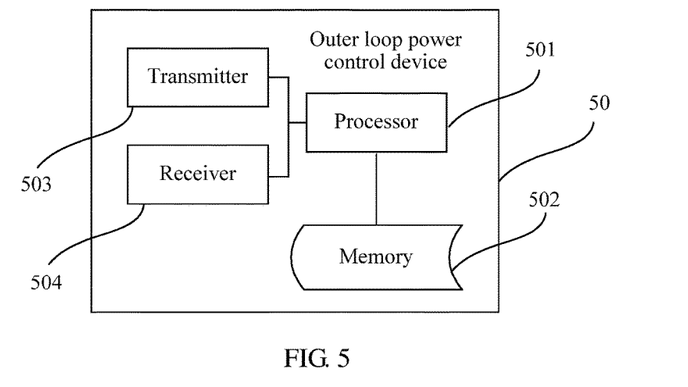
FIG. 5 is a schematic structural diagram of Embodiment 1 of an outer loop power control device according to the present invention.

FIG. 5 is a schematic structural diagram of Embodiment 1 of an outer loop power control device according to the present invention. As shown in FIG. 5, an outer loop power control device 50 provided in this embodiment includes a processor 501 and a memory 502. The outer loop power control device 50 may further include a transmitter 503 and a receiver 504. The transmitter 503 and the receiver 504 may be connected to the processor 501. The transmitter 503 is configured to send data or information; the receiver 504 is configured to receive data or information; and the memory 502 stores an execution instruction. When the outer loop power control device 50 runs, the processor 501 communicates with the memory 502, and the processor 501 invokes the execution instruction in the memory 502 to execute the technical solutions of any one of method Embodiments 1 to 4. The implementation principles and technical effects thereof are similar, and details are not described herein again.

In the several embodiments provided in the present application, it should be understood that the disclosed device and method may be implemented in other manners. For example, the device embodiment described above is merely exemplary. For example, the unit or module division is mere logical function division and may be other division in actual implementation. For example, a plurality of units or modules may be combined or integrated into another system, or some features may be ignored or not implemented. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An outer loop power control method, comprising:
    determining, by a base station, a target value of a performance mapping indicator of a user equipment (UE) in each cell according to a mapping relationship that is between a target value of a control channel performance indicator of the UE in each cell and the performance mapping indicator and that is obtained using an offline simulation, wherein the performance mapping indicator is different from the control channel performance indicator and is one of a pilot signal bit error rate, a reference signal bit error rate, and a control channel reference measurement miss detection probability, wherein the control channel reference measurement miss detection probability is a ratio of a counted quantity of occurrences of miss detection to a total quantity of occurrences of detection in a preset time, wherein miss detection is, after a channel quality indicator (CQI) or an enhanced dedicated physical control channel (E-DPCCH) is decoded, a ratio of signal power to noise power being less than a predetermined reference measurement threshold;
    acquiring, by the base station, a measured value of the performance mapping indicator of the UE in each cell;
    determining, by the base station, a signal-to-noise ratio target value of the UE in each cell according to the target value of the performance mapping indicator of the UE in each cell and a measured value of the performance mapping indicator, wherein the determining the signal-to-noise ratio target value of the UE in each cell comprises performing at least one of:
        increasing, by the base station, the signal-to-noise ratio target value in response to at least one of a measured value of the pilot signal bit error rate or a measured value of the reference signal bit error rate being greater than at least one of the target value of the pilot signal bit error rate or the target value of the reference signal bit error rate; or
        increasing, by the base station, the signal-to-noise ratio target value in response to a measured value of the control channel reference measurement miss detection probability being greater than the target value of the control channel reference measurement miss detection probability; or
        decreasing, by the base station, the signal-to-noise ratio target value in response to at least one of a measured value of the pilot signal bit error rate or a measured value of the reference signal bit error rate being less than at least one of the target value of the pilot signal bit error rate or the target value of the reference signal bit error rate, and further in response to a measured value of the control channel reference measurement miss detection probability being less than the target value of the control channel reference measurement miss detection probability;
    adjusting, by the base station, the target value of the performance mapping indicator according to measured values of all control channel performance indicators collected in a preset period, wherein the adjusting the target value of the performance mapping indicator according to measured values of all control channel performance indicators collected in a preset period comprises performing at least one of:
        decreasing, by the base station, the target value of the performance mapping indicator in response to a measured value of the control channel performance indicator being less than a first threshold; or
        increasing, by the base station, the target value of the performance mapping indicator in response to a measured value of the control channel performance indicator being greater than a second threshold; and
    performing, by the base station, outer loop power control on the UE in each cell according to the signal-to-noise ratio target value of the UE in each cell, wherein the outer loop power control controls communication of the UE and causes a measured value of the performance mapping indicator to reach the target value of the performance mapping indicator.

2. The method according to claim 1, wherein the determining the target value of the performance mapping indicator of the UE in each cell comprises performing at least one of:
    mapping, by the base station, the target value of the control channel performance indicator that is based on hard-decision demodulation to a target value of the pilot signal bit error rate or a target value of the reference signal bit error rate; or
    mapping, by the base station, the target value of the control channel performance indicator that is based on a decoding result to a target value of the control channel reference measurement miss detection probability.

3. The method according to claim 1, further comprising:
    sending, by the base station, to the UE and after the determining the signal-to-noise ratio target value of the UE in each cell, an indication indicating whether control channel performance is restricted.

4. The method according to claim 1, further comprising:
    determining, by the base station before the determining the target value of the performance mapping indicator, and before the acquiring, by the base station, the measured value of the performance mapping indicator, that no data is to be sent by the UE in each cell on at least one of a dedicated channel (DCH) or an enhanced dedicated channel (E-DCH) in a preset period.

5. The method according to claim 1, wherein the determining the signal-to-noise ratio target value of the UE in each cell comprises:

determining, by the base station, a signal-to-noise ratio target value of each cell according to the target value of the performance mapping indicator of the UE in each cell and the measured value of the performance mapping indicator; and determining, by the base station, the signal-to-noise ratio target value of the UE according to the signal-to-noise ratio target value of each cell.

6. A base station, comprising:

a processor; and a non-transitory computer-readable storage medium storing a program to be executed by the processor, the program including instructions for:

determining a target value of a performance mapping indicator of a user equipment (UE) in each cell according to a mapping relationship that is between a target value of a control channel performance indicator of the UE in each cell and the performance mapping indicator and that is obtained using an offline simulation, wherein the performance mapping indicator is one of a pilot signal bit error rate, a reference signal bit error rate, and a control channel reference measurement miss detection probability, wherein the control channel reference measurement miss detection probability is a ratio of a counted quantity of occurrences of miss detection to a total quantity of occurrences of detection in a preset time, and wherein miss detection is, after a channel quality indicator (CQI) or an enhanced dedicated physical control channel (E-DPCCH) is decoded, a ratio of signal power to noise power being less than a predetermined reference measurement threshold;

determining, a signal-to-noise ratio target value of the UE in each cell according to the target value of the performance mapping indicator of the UE in each cell and a measured value of the performance mapping indicator, wherein the instructions for determining the signal-to-noise ratio target value of the UE in each cell includes instructions for performing at least one of:

increasing the signal-to-noise ratio target value in response to at least one of a measured value of the pilot signal bit error rate or a measured value of the reference signal bit error rate being greater than at least one of the target value of the pilot signal bit error rate or the target value of the reference signal bit error rate; or increasing the signal-to-noise ratio target value in response to a measured value of the control channel reference measurement miss detection probability being greater than the target value of the control channel reference measurement miss detection probability; or decreasing the signal-to-noise ratio target value in response to at least one of a measured value of the pilot signal bit error rate or a measured value of the reference signal bit error rate is less than the target value of the pilot signal bit error rate or the target value of the reference signal bit error rate, and a measured value of the control channel reference measurement miss detection probability is less than the target value of the control channel reference measurement miss detection probability;

adjusting the target value of the performance mapping indicator according to measured values of all control channel performance indicators collected in a preset period, wherein the instructions for adjusting the target value of the performance mapping indicator comprise instructions for performing at least one of:

decreasing the target value of the performance mapping indicator in response to a measured value of the control channel performance indicator is less than a first threshold; or increasing the target value of the performance mapping indicator in response to a measured value of the control channel performance indicator is greater than a second threshold; and performing, outer loop power control on the UE in each cell according to the signal-to-noise ratio target value of the UE, wherein the outer loop power control controls communication of the UE and causes a measured value of the performance mapping indicator to reach the target value of the performance mapping indicator.

7. The base station according to claim 6, wherein the instructions for determining, the target value of the performance mapping indicator of the UE in each cell comprises instructions for performing at least one of:

mapping the target value of the control channel performance indicator that is based on hard-decision demodulation to at least one of a target value of the pilot signal bit error rate or a target value of the reference signal bit error rate; or mapping the target value of the control channel performance indicator that is based on a decoding result to a target value of the control channel reference measurement miss detection probability.

8. The base station according to claim 6, the program further including instructions for:

sending, to the UE in each cell, after the determining a signal-to-noise ratio target value of the UE, an indication indicating whether control channel performance is restricted, to the UE.

9. The base station according to claim 6, the program further including instructions for:

determining, before the determining the target value of the performance mapping indicator, and before the acquiring the measured value of the performance mapping indicator, that no data is to be sent by the UE on at least one of a dedicated channel (DCH) or an enhanced dedicated channel (E-DCH) in a preset period.

10. The base station according to claim 9, wherein the instructions for determining the signal-to-noise ratio target value of the UE in each cell comprises instructions for:

determining a signal-to-noise ratio target value of each cell according to the target value of the performance mapping indicator of the UE in each cell and the measured value of the performance mapping indicator; and determining the signal-to-noise ratio target value of the UE according to the signal-to-noise ratio target value of each cell.

11. A base station, comprising:

a processor; and a non-transitory computer-readable storage medium storing a program to be executed by the processor, the program including instructions for:

determining a target value of a performance mapping indicator of a user equipment (UE) in each cell according to a mapping relationship that is between a target value of a control channel performance indicator of the UE in each cell and the performance mapping indicator and that is obtained using an offline simulation, wherein the performance mapping indicator is one of a pilot signal bit error rate, a reference signal bit error rate, and a control channel reference measurement miss detection probability, wherein the control channel reference measurement miss detection probability is a ratio of a counted quantity of miss detections to a total quantity of detections in a preset time, and wherein a miss detection is, after a channel quality indicator (CQI) or an enhanced dedicated physical control channel (E-DPCCH) is decoded, a ratio of signal power to noise power being less than a predetermined reference measurement threshold;

determining a signal-to-noise ratio target value of the UE in each cell according to the target value of the performance mapping indicator of the UE in each cell and a measured value of the performance mapping indicator, wherein the instructions for determining the signal-to-noise ratio target value of the UE in each cell includes instructions for performing at least one of:
  increasing the signal-to-noise ratio target value in response to at least one of a measured value of the pilot signal bit error rate or a measured value of the reference signal bit error rate being greater than at least one of the target value of the pilot signal bit error rate or the target value of the reference signal bit error rate; or
  increasing the signal-to-noise ratio target value in response to a measured value of the control channel reference measurement miss detection probability being greater than the target value of the control channel reference measurement miss detection probability; or
  decreasing the signal-to-noise ratio target value in response to at least one of a measured value of the pilot signal bit error rate or a measured value of the reference signal bit error rate is less than the target value of the pilot signal bit error rate or the target value of the reference signal bit error rate, and a measured value of the control channel reference measurement miss detection probability is less than the target value of the control channel reference measurement miss detection probability;

adjusting, by the base station, a target value of the performance mapping indicator according to measured values of all control channel performance indicators collected in a preset period, wherein the instructions for adjusting the target value of the performance mapping indicator according to measured values of all control channel performance indicators collected in a preset period include instructions for performing at least one of:
  decreasing, by the base station, the target value of the performance mapping indicator in response to a measured value of the control channel performance indicator being less than a first threshold; or
  increasing, by the base station, the target value of the performance mapping indicator in response to a measured value of the control channel performance indicator being greater than a second threshold; and performing, outer loop power control on the UE in each cell according to the signal-to-noise ratio target value of the UE, wherein the outer loop power control controls communication of the UE and causes a measured value of the performance mapping indicator to reach the target value of the performance mapping indicator.

12. The base station according to claim 11, wherein the instructions for determining, the target value of the performance mapping indicator of the UE in each cell comprises instructions for performing at least one of:
  mapping the target value of the control channel performance indicator that is based on hard-decision demodulation to at least one of a target value of the pilot signal bit error rate or a target value of the reference signal bit error rate; or
  mapping the target value of the control channel performance indicator that is based on a decoding result to a target value of the control channel reference measurement miss detection probability.

* * * * *